(12) United States Patent
Nath

(10) Patent No.: US 11,154,885 B2
(45) Date of Patent: Oct. 26, 2021

(54) FLUID DELIVERY FOR MACHINING PROCESSES

(71) Applicant: Hitachi, Ltd., Tokyo (JP)

(72) Inventor: Chandra Nath, Wixom, MI (US)

(73) Assignee: HITACHI, LTD., Tokyo (JP)

( * ) Notice: Subject to any disclaimer, the term of this patent is extended or adjusted under 35 U.S.C. 154(b) by 96 days.

(21) Appl. No.: 16/401,190

(22) Filed: May 2, 2019

(65) Prior Publication Data

US 2020/0346233 A1    Nov. 5, 2020

(51) Int. Cl.
*B05B 7/24* (2006.01)
*B23Q 11/10* (2006.01)
*B23B 29/24* (2006.01)

(52) U.S. Cl.
CPC .......... *B05B 7/2489* (2013.01); *B23B 29/242* (2013.01); *B23Q 11/1038* (2013.01);
(Continued)

(58) Field of Classification Search
CPC ............. Y10T 29/5154; Y10T 29/5155; Y10T 82/2506; Y10T 82/2508; Y10T 82/2587;
(Continued)

(56) References Cited

U.S. PATENT DOCUMENTS

| 412,255 A | 10/1889 | Hattery | |
| 2,612,405 A * | 9/1952 | Kirschbaum | ........... B05B 7/065 239/404 |

(Continued)

FOREIGN PATENT DOCUMENTS

| DE | 4205273 C1 * 12/1992 |
| DE | 102019003392 A1 * 11/2020 |

(Continued)

OTHER PUBLICATIONS

Clarens, et al., "Evaluation of Cooling Potential and Tool Life in Turning Using Metalworking Fluids Delivered in Supercritical Carbon Dioxide", The American Society of Mechanical Engineers, International Manufacturing Science and Engineering Conference, vol. 1; 2009, Abstract only.*

(Continued)

*Primary Examiner* — Erica E Cadugan
(74) *Attorney, Agent, or Firm* — Mattingly & Malur, PC

(57) ABSTRACT

In some examples, a moveable member including multiple tools is moveable relative to a fixed member to position a selected tool for performing an operation. A first connector half may be included on the fixed member for connecting to one of a plurality of second connector halves included on the moveable member. Movement of the moveable member to position the selected tool for performing the operation moves a respective second connector half associated with the selected tool into connection with the first connector half. In addition, a respective nozzle assembly may be associated with each tool. The respective nozzle assembly may receive multiple fluids including at least one fluid received through the connection between the connector halves. The nozzle assembly includes an inner nozzle that outputs a gas and an annular outer nozzle that outputs a machining liquid to generate a mixture to direct toward a tool-workpiece interface.

20 Claims, 6 Drawing Sheets

(52) U.S. Cl.
CPC .... *B23Q 11/1046* (2013.01); *B23Q 2220/002* (2013.01); *Y10S 29/054* (2013.01); *Y10S 29/089* (2013.01); *Y10T 29/5154* (2015.01)

(58) Field of Classification Search
CPC .................................. Y10T 408/44–46; Y10T 409/303976–304032; Y10T 408/37; B23Q 11/10–1092; B23Q 2220/002; B23B 29/24–34; B23B 39/20–205; Y10S 82/90; Y10S 29/05; Y10S 29/089; Y10S 29/054; Y10S 29/092; Y10S 29/085; B05B 7/065
USPC ......... 29/39–40, DIG. 50, DIG. 89, DIG. 54, 29/DIG. 92, DIG. 85; 82/159, 120–121, 82/900; 408/56–61, 35; 409/135–136
See application file for complete search history.

(56) References Cited

U.S. PATENT DOCUMENTS

| | | | | |
|---|---|---|---|---|
| 2,929,566 | A * | 3/1960 | Paasche | B23Q 11/1084 239/273 |
| 3,829,103 | A * | 8/1974 | Sussman | B23Q 11/103 277/500 |
| 4,060,219 | A | 11/1977 | Crawford | |
| 4,179,068 | A * | 12/1979 | Dombrowski | B05B 7/0433 239/129 |
| 5,190,421 | A * | 3/1993 | Wen | B23Q 11/10 184/6.14 |
| 5,509,335 | A * | 4/1996 | Emerson | B23Q 11/1053 409/136 |
| 7,185,877 | B2 | 3/2007 | Budde | |
| 7,758,908 | B2 | 7/2010 | Pham et al. | |
| 9,254,550 | B2 | 2/2016 | Haverty et al. | |
| 9,803,801 | B2 * | 10/2017 | Mathai | B23Q 11/0046 |
| 9,808,815 | B2 | 11/2017 | Kapoor et al. | |
| 2004/0237542 | A1 * | 12/2004 | Zurecki | B23Q 11/1053 62/50.7 |
| 2012/0186053 | A1 * | 7/2012 | Meidar | B23Q 5/04 29/39 |
| 2015/0367473 | A1 * | 12/2015 | Meidar | B23Q 11/1053 29/40 |
| 2020/0061766 | A1 * | 2/2020 | Izumi | B23Q 11/10 |

FOREIGN PATENT DOCUMENTS

| | | | | |
|---|---|---|---|---|
| JP | 2002-103178 | A | * | 4/2002 |
| JP | 2014-240104 | A | * | 12/2014 |
| JP | 2017-019076 | A | * | 1/2017 |

OTHER PUBLICATIONS

Jun, et al., "An Experimental Evaluation of an Atomization-Based Cutting Fluid Application System for Micromachining", Search Journal of Manufacturing Science and Engineering 130(3), Jun. 12, 2008, Abstract only.*

Ezugwu, et al., "Titanium alloys and their machinability a review", Journal of Materials Processing Technology 68 (1997) p. 262-274.

Hoyne, et al. "On Cutting Temperature Measurement During Titanium Machining With an Atomization-Based Cutting Fluid Spray System", Journal of Manufacturing Science and Engineering, vol. 137, Apr. 2015.

Chandra Nath, et al. "Design and evaluation of an atomization-based cutting fluid spray system in turning of titanium alloy", Journal of Manufacturing Processes 14 (2012) p. 452-459.

Sun, et al., "Machining Ti—6Al—4V alloy with cryogenic compressed air cooling", International Journal of Machine Tools & Manufacture 50 (2010) p. 933-942.

Machado, et al., "The effect of extremely low lubricant volumes in machining", Wear 210 (1997) p. 76-82.

Tai, et al., "Minimum Quantity Lubrication (MQL) in Automotive Powertrain Machining", Procedia CIRP 14 ( 2014 ) p. 523-528.

The National Institute for Occupational Safety and Health (NIOSH), https://www.cdc.gov/niosh/topics/metalworking/default.html; Aug. 16, 2013.

MQL: The future of metal cutting fluid, Unist, Inc., http://unist.com/mql-machining.html; 2018.

Sustainable Production Using Minimal Quantity Lubrication, Noria Corporation Report, https://www.machinerylubrication.com/Read/2186/minimal-quantitv-lubrication; Feb. 1, 2019.

The Many Ways Ford Benefits from MQL: Modern Machine Shop, Article Post : Sep. 24, 2010 by Derek Korn, Executive Editor, Modem Machine Shop., https://www.mmsonline.com/articles/the-many-ways-ford-beneflts-from-mql.

Clarens, et al., "Feasibility of Metalworking Fluids Delivered in Supercritical Carbon Dioxide", Journal of Manufacturing Processes vol. 8, No. 1, 2006.

Rukosuyev, et al., "Understanding the effects of the system parameters of an ultrasonic cutting fluid application system for micromachining", Journal of Manufacturing Processes 12 (2010) p. 92-98.

Prabhakaran, et al., "Effect of temperature on atomization in gas centered coaxial injection systems", Bombay: Indian Institute of Technology, 2009.

Schumaker, et al., "A Study of Gas-Centered Swirl Coaxial Injectors Using X-ray Radiography", ICLASS 2012, 12th Triennial International Conference on Liquid Atomization and Spray Systems, Heidelberg, Germany, Sep. 2-6, 2012.

Mehta, "Manufacturer, Supplier and Exporter of Camlock Coupling, Bauer Coupling, Pneumatic Products, Pipe Fittings, Globe Valves, Quick Release Coupling, Air Hose Reels and Many Other", Hindustan Engineers. http://www.transaircamlockcoupling.com/gas-charging-quick-coupler-3971543.html, Feb. 1, 2019.

Fellouah, et al., "Reynolds number effects within the development region of a turbulent round free jet", International Journal of Heat and Mass Transfer 52 (2009) p. 3943-3954.

Parker, et al. "Control of an axisymmetric jet using apassive ring", Experimental Thermaland Fluid Science 27 (2003) p. 545-552.

Hoyne, et al. "Characterization of Fluid Film Produced by an Atomization Based Cutting Fluid Spray System During Machining", Journal of Manufacturing Science and Engineering, vol. 135, Oct. 2013.

Yama Seiki—Flat-Bed Turning Center HA Series Turret; Copyright: Yama Seiki USA Inc. 2017. http://www.yamaseiki.com/yama_en/turning/horizontal/ha/turret.htm.

* cited by examiner

FLUID DELIVERY FOR MACHINING PROCESSES

BACKGROUND

During machining of mechanical parts, a tool in contact with a workpiece typically results in local abrasion and friction forces, which may produce high temperatures at the contact interface between the tool and the workpiece. As one example, when machining a metal workpiece, plastic deformation and shearing of the material may cause localized machining temperatures at the tool-workpiece interface that may exceed 500 degrees C. If not prevented, such high machining temperatures may cause severe tool wear and poor chip formation, which can lead to reduced product quality and lowered productivity. To prevent these high temperatures, a liquid may typically be applied to the tool-workpiece interface to cool and lubricate the site. Conventional cooling and lubrication techniques may employ fluids that are expensive and environmentally unfriendly. Further, some studies indicate that exposure to large quantities of some types of fluids may pose possible health risks for workers. Accordingly, achieving effective and low-cost cooling and lubrication when performing machining processes continues to be a challenge.

SUMMARY

Some implementations include arrangements and techniques for supplying fluid for a machining process. In some examples, a moveable member including multiple tools is moveable relative to a fixed member to position a selected tool for performing an operation. A first connector half may be included on the fixed member for connecting to one of a plurality of second connector halves included on the moveable member. Movement of the moveable member to position the selected tool for performing the operation moves a respective second connector half associated with the selected tool into connection (e.g., fluid communication) with the first connector half. In addition, a respective nozzle assembly may be associated with each tool. The respective nozzle assembly may receive multiple fluids including at least one fluid received through the connection between the connector halves. The nozzle assembly includes an inner nozzle that outputs a gas and an annular outer nozzle that outputs a machining liquid to generate a mixture to direct toward a tool-workpiece interface.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
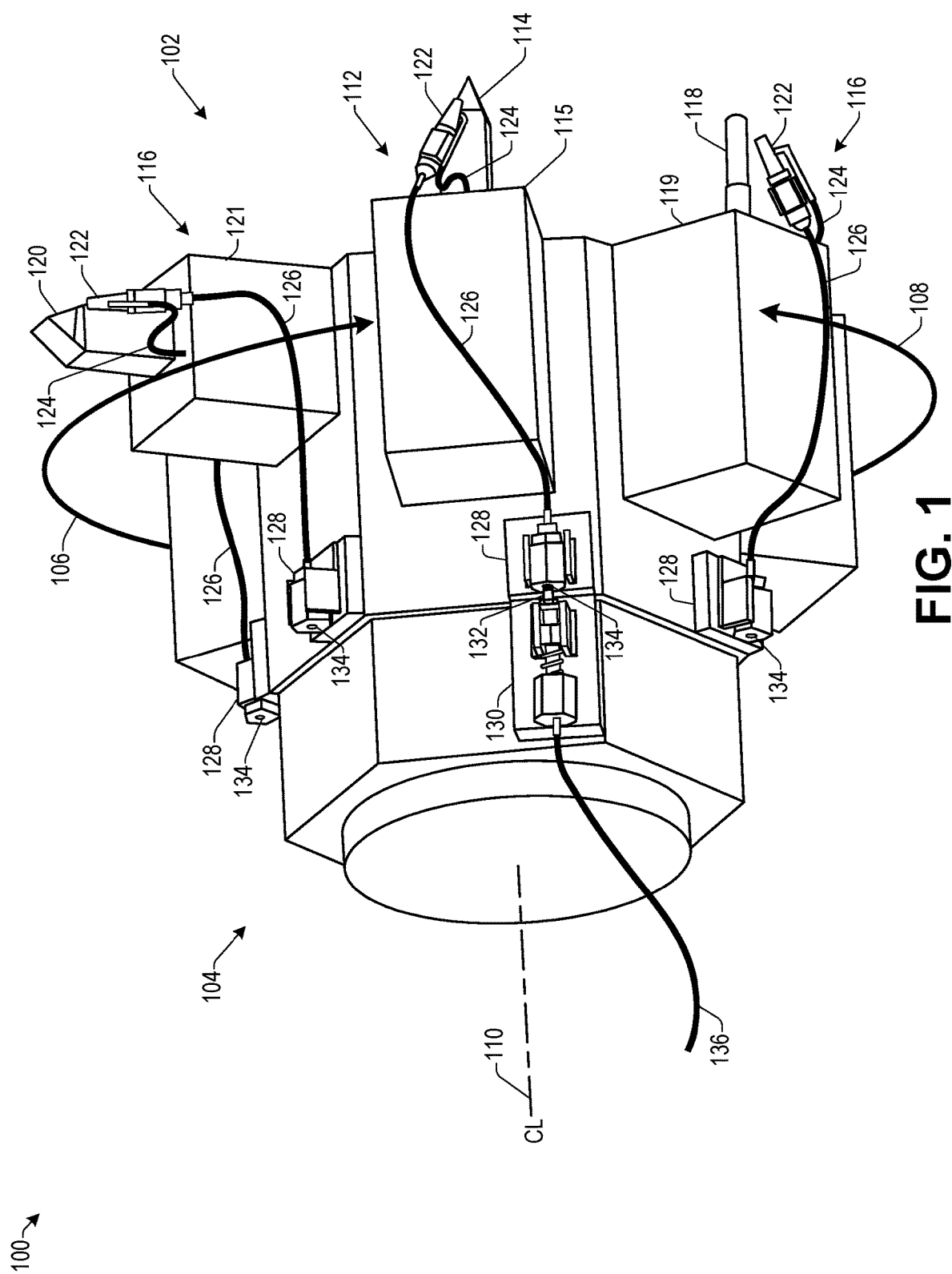
FIG. 1 illustrates a machining apparatus including a fluid delivery system according to some implementations.

The technology herein includes novel arrangements and techniques for an integrated spray system that provides a gas-centered atomization-based machining liquid spray nozzle for providing cooling and lubrication to a tool-workpiece interface. In addition, some examples include a quick auto-connecting interchangeable coupling for enabling the spray nozzle to be mounted on a rotatable multi-tool machining turret or other moveable multi-tool apparatus. Thus, in some examples, a spray nozzle may be associated with each tool on a multi-tool apparatus, and may be automatically connected to a gas supply as the apparatus is moved to a selected tool position.

Some implementations include a gas-centered fluid spray system that delivers a machining liquid as a mist spray of droplets to the machining zone, i.e., the tool-workpiece interface. For instance, due to the nozzle configuration, the droplets may be generated from the machining liquid by a shearing mechanism resulting from passing a high-pressure gas, such as air, an air-carbon dioxide mixture, nitrogen, or the like through a gas delivery portion of the nozzle. In some examples, the nozzle may include an inner gas-delivery nozzle and an annular outer liquid delivery nozzle. For instance, the gas nozzle may be cylindrical or conical in shape. The machining liquid may be delivered to the outer nozzle, which is co-axially arranged with the inner nozzle to create an annular space around the inner nozzle. Thus, the gas may be delivered under high pressure (e.g., four bars or greater) through the inner center nozzle. The machining liquid is delivered through the annular nozzle surrounding the inner nozzle. The gas exiting the inner nozzle may shear the liquid exiting the annulus, generating droplets, while a portion of the gas remains as a conical core that further entrains and propels the droplets. After progression within tens of millimeters distance, a fully developed mist spray of gas and liquid droplets mixture is achieved.

When impinging on the tool-workpiece interface, the mist droplets may produce a dynamic fast moving thin fluid film. The thin fluid film may penetrate the tool-workpiece interface to provide cooling and lubrication during metalworking or other machining processes. The machining liquid is delivered to the outer nozzle, which forms an annular space around the inner nozzle for receiving the machining liquid. The outer body surface of the inner nozzle and the inner body surface of the outer nozzle may be tapered cones, and the machining liquid within the annular space flows by the help of gravity when oriented for machining. In some cases, as a non-limiting example, the taper angle may be 4-10 degrees, the exit diameter of the gas nozzle may be 0.4-1 mm, and the annular space may be formed by a gap between the two nozzle surfaces that may be 0.3-0.5 mm. For example, if the gap is too small (e.g., less than 0.3 mm) the liquid might have difficulty flowing due to capillary action of the viscous fluid with the contact surfaces. On the other hand, if the gap is too large, this may produce inconsistent and uneven flow of the machining liquid around the outer body surface of the inner nozzle. The outside surface of the outer nozzle may also have a conical or otherwise tapered shape so that long chips, if produced during machining, may not entangle or otherwise interfere with the nozzle assembly.

In a typical computer numeric controlled (CNC) machine, such as a multi-tool machining center, multiple operations such as turning, milling, drilling, etc., may be employed sequentially for parts manufacturing. The machining processes may be performed one-by-one, and the turret position may be rotated to position a different tool for each sequential process for performing a plurality of machining steps without human interaction. In some examples, herein, each different tool on the turret may have a separate individual cooling nozzle assembly associated with the tool. Thus, each of the tooling stations may have an individual dedicated machining liquid nozzle assembly as described herein. Further, the position of the nozzle assemblies may be adjustable at each tooling station, such as by mechanical fasteners, magnetic fasteners, or the like, for orienting the spray nozzle at a desired angle for providing cooling and lubrication when performing respective machining operations.

Furthermore, the automatic connection fluid coupling herein enables gas or other fluid to be delivered to the correct tool as the turret is rotated to utilize a particular tool. The fluid coupling herein may include a fluid-providing connector half having a connector nozzle that is biased by a spring toward a detent in a fluid-receiving connector half mounted on the turret. The fluid-receiving connector half includes a central bore in the detent that receives gas or other fluid passed through the connector nozzle of the fluid-providing connector half when the connector nozzle is positioned in the detent. Further, the fluid-receiving connector half may include a convex ramped surface on either side of the detent to depress the spring on the fluid-providing connector half prior to engagement of connector nozzle with the detent. Accordingly, rotation of the turret relative to a stationary base results in the fluid-providing connector half automatically disengaging with a first fluid-receiving connector half associated with a first tool, and engaging with a second fluid-receiving connector half associated with a selected second tool on the turret, thereby automatically connecting supplied gas to the fluid delivery nozzle assembly associated with the selected tool.

Some examples herein include an environmentally friendly cooling and lubrication delivery system that provides coolant and lubricant at the tool-workpiece interface with minimal quantity lubrication (MQL) by delivering atomized machining liquid droplets as a mist spray mixed with an inert gas, such as air and/or carbon dioxide, or the like. For example, the gas may be delivered at high velocity to shear the machining liquid to produce the droplets. For discussion purposes, some example implementations are described in the environment of automated machining of workpieces, or the like. However, implementations herein are not limited to the particular examples provided, and may be extended to other service environments, other uses for the fluid delivery system, or the like, as will be apparent to those of skill in the art in light of the disclosure herein.

FIG. 1 illustrates a machining apparatus 100 including a fluid delivery system according to some implementations. The machining apparatus 100 includes a rotatable turret 102 as an example movable member that is rotatably mounted on a turret base 104, which is a static or otherwise fixed member. For example, the turret base 104 may be fixed or otherwise not movable relative to the turret 102, which is moveable relative to the turret base 104. Thus, as indicated by arrows 106 and 108, the turret 102 may rotate in at least one direction about a centerline of rotation 110 of the turret base 104.

The turret 102 may include a plurality of tool stations, each including a respective tool, that are rotatable to a working position 112. In the illustrated example, a turning tool 114 at a first tool station 115 is positioned in the working position 112, while a plurality of other tools are located in idle positions 116. Other tools illustrated in this example include a milling tool 118 at a second tool station 119, and a turning tool 120 at a third tool station 121, both located in idle positions 116. Implementations herein are not limited to any particular type of machining tools, as will be apparent to those of skill in the art having the benefit of the disclosure herein.

In the illustrated example, a fluid delivery nozzle assembly 122 is associated with each of the tools mounted on the turret 102. For example, a nozzle assembly 122 is positioned for spraying fluid toward the tip of the turning tool 114. Similarly, a nozzle assembly 122 is positioned for spraying fluid towards the milling tool 118. Additionally, a nozzle assembly 122 is positioned for spraying fluid toward the tip of the turning tool 120. Each of the fluid spray nozzles 122 may include a fluid line 124 for connecting to a fluid source (not shown in FIG. 1). In addition, each of the nozzle assembly 122 may include a fluid line 126 for connecting the nozzle to a fluid-receiving connector half 128. Accordingly, each nozzle assembly 122 may be positioned to spray a cooling and lubricating gas-liquid mixture toward a tool-workpiece interface when the associated tool is being used for machining. For instance, a machining liquid may be provided through the fluid lines 124 and the gas may be provided through the fluid lines 126. Alternatively, in other examples, the machining liquid may be provided through the fluid lines 126 and the gas may be provided through the fluid lines 124.

As illustrated, when a selected tool is in the working position 112, the associated fluid-receiving connector half 128 may be aligned with a fluid-providing connector half 130 positioned on the turret base 104. As discussed additionally below, the fluid-providing connector half 130 may include a connector nozzle 132 that enters a detent 134 in the fluid-receiving connector half 128 when the respective tool is positioned in the working position 112. The fluid-providing connector half 130 may include a fluid line 136 that is connectable to one or more gas sources or a liquid source (not shown in FIG. 1) as discussed additionally below. In some examples, the fluid lines 124 for individual nozzle assemblies 122 may be connected to respective built-in liquid connection points that typically already exist in a CNC system. However, in other examples, gas may be delivered through the fluid lines 124 and machining liquid may be delivered through the fluid lines 126. Additionally, in the implementations herein, because the flow rate of the machining liquid may typically be very low relative to conventional systems (e.g., 1-30 milliliters per minute), a liquid pump may not be required in the fluid supply system herein, and the machining liquid may be gravity fed or the like.

Examples of the machining liquid used in some implementations herein may include various type of cutting liquids, such as mineral liquids, semi-synthetic liquids, and synthetic liquids, examples of which may include petroleum-based mineral oils, kerosene, rubbing alcohol, motor oils, dielectric fluids, neatsfoot oil, soluble oils, such as an emulsion or microemulsion of water with a mineral oil or other oils, and synthetic coolants/lubricants. Implementations herein are not limited to any particular type of machining liquid.

With multiple different tools at multiple tooling stations, respectively, on the turret 102, each nozzle assembly 122 includes a respective fluid line 124 and also includes a respective fluid line 126. In the illustrated example, suppose the machining liquid is delivered through the fluid line 124 and gas is delivered through the fluid line 126. When a tool is selected to perform a specific operation, i.e., turning, milling, drilling, etc., such as by a CNC program, the turret 102 may be rotated to move a corresponding tool station with the selected tool to the working position 112. As discussed additionally below, the rotation of the turret 102 causes the connector nozzle 132 to disengage from the detent 134 and re-engage with a different detent 134 in a different connector half 128 that is rotated to the working position 112. The disengagement and re-engagement may be performed automatically without human intervention due to the configuration of the fluid-providing connector half 130 and the fluid-receiving connector half 128. Further, while the connector half 130 having the connector nozzle is illustrated as being mounted on the static member, i.e., on the turret base 104 in this example, in other examples, the positions may be reversed and the connector half 128 with the detent 134 may be mounted on the static member and a plurality of the connector halves 130 having the connector nozzle 132 may be mounted on the turret 102.

The nozzle assembly 122 is positioned to spray a gas-liquid mixture including a fine mist of atomized machining liquid droplets and high velocity gas onto a tool-workpiece interface. The fluid delivery techniques herein may use a very small amount of machining liquid as compared to conventional fluid delivery technologies. As one example, the system herein may be configured to deliver 1-30 milliliters of machining liquid per minute when machining metal workpieces. Accordingly, the system herein may be inexpensive to operate, while also providing high quality machining results and extended tool life. Moreover, due to the very small amount of machining liquid used, the system herein may provide a near-dry and green manufacturing environment.

The fluid delivery system herein may be used with a large variety of metalworking or other machining applications, regardless of whether single or multiple machining operations are performed by the same machine. The fluid delivery system may be used to apply cooling and lubrication at the tool-workpiece interface in machining processes, or to other locations in various other manufacturing processes. The fluid delivery system herein may provide improved machining performance by reducing saw tooth marks, machining lines, and chip whips on the machined surface, as well as providing better chip breakability and near-dry machining. The fluid delivery system herein may also reduce the friction coefficient between the tool and the workpiece surface for providing a high quality surface finish, improved tool life, and thus, improved machining productivity.

Figure 2:
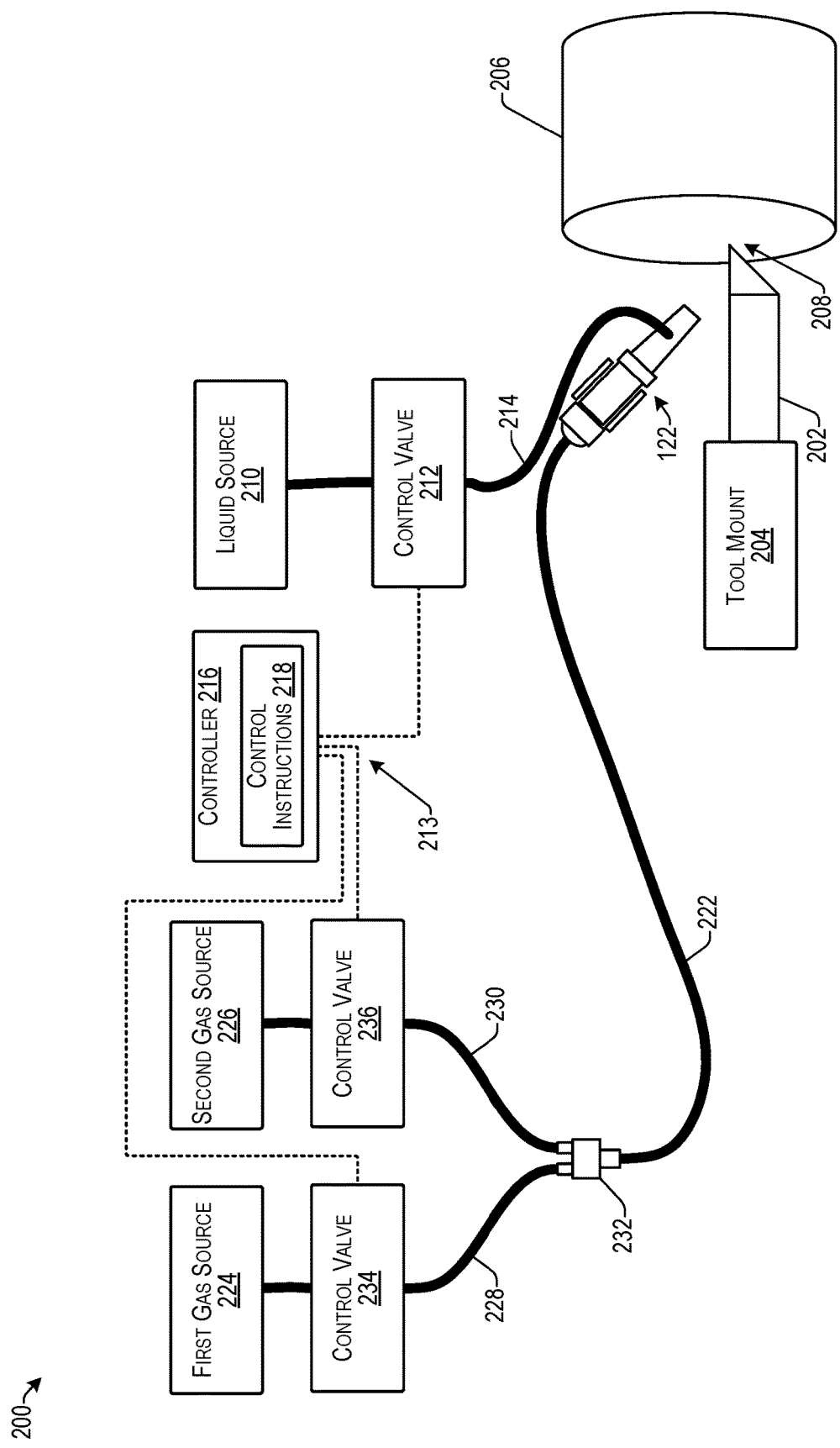
FIG. 2 illustrates an example fluid delivery system according to some implementations.

FIG. 2 illustrates an example fluid delivery system 200 according to some implementations. In some cases, the fluid delivery system 200 may correspond to the fluid delivery system discussed above with respect to the machining apparatus 100 of FIG. 1. In the illustrated example, a tool 202 is mounted on a tool mount 204 and positioned with respect to a workpiece 206 for machining the workpiece at a tool-workpiece interface 208. A nozzle assembly 122 is positioned to direct a gas-liquid mixture at the tool-workpiece interface 208 for providing cooling and lubrication during a machining process performed using the tool 202 on the workpiece 206. For instance, in some examples, the gas-liquid mixture may be a mist spray of atomized liquid droplets. Thus, the pressurized gas exiting the nozzle may separate the machining liquid into very fine droplets, mix the droplets within the gas, and propel the gas-liquid mixture toward a target, such as the tool-workpiece interface 208. In some examples, the tool mount 204 may be mounted on a turret, such as that discussed above with respect to FIG. 1, or may be mounted on any other type of machining apparatus, as will be apparent to those of skill in the art having the benefit of the disclosure herein.

A liquid source 210 may provide machining liquid to the nozzle assembly 122. For instance, a control valve 212 may be positioned along a fluid supply line 214 for controlling the flow of the machining liquid to the nozzle assembly 122. In some cases, a controller 216 may be in communication with the control valve 212 via one or more control lines 213 for controlling the control valve 212, and thereby controlling the flow of liquid from the liquid source 210 to the nozzle assembly 122. For instance, the controller 216 may execute control instructions 218 for controlling the control valve 212 and other aspects of the machining process, as discussed additionally below.

In addition, the system 200 may include one or more gas sources for providing gas to the nozzle assembly 122 via a gas line 222. In this example, the system 200 includes a first gas source 224 and a second gas source 226. In other examples, however, the system 200 may include more or fewer gas sources. Each gas source 224 or 226 may provide pressurized gas through a gas line 228 or 230, respectively, to a Y junction 232 where the respective gases may be mixed and conducted through the gas line 222 to the nozzle assembly 122.

A control valve 234 may control the flow of gas from the first gas source 224. Furthermore, a control valve 236 may control the flow of gas from the second gas source 226. The control valves 234 and 236 may be in communication with the controller 216 via the one or more control lines 213, and may be controlled by execution of the control instructions 218 for automatically controlling the flow of gas from the respective gas sources 224 and/or 226. As several non-limiting examples, the first gas source 224 may provide pressurized air and the second gas source 226 may provide pressurized carbon dioxide, or other inert gas. Furthermore, in some examples, only a single gas source may be employed and the second gas source may be eliminated.

Accordingly, the controller 216 may control the flow of the liquid from the liquid source 210, and the gas from at least one of the first gas source 224 and the second gas source 226 for providing a lubricating and cooling mixture of gas and liquid to the tool-workpiece interface 208. In addition, the controller 216 may also control the machining process itself, such as controlling rotation or other movement of the tool 202 or the workpiece 206, as well as controlling the rotation or other movement of a turret, or the like, such as discussed above with respect to FIG. 1. Thus, the fluid delivery system 200 may be incorporated into the apparatus 100 discussed above to enable automated delivery of the machining fluids and automated control of machining processes performed using the multiple tools on the turret.

In some examples, the controller 216 may be implemented as one or more central processing units, microprocessors, microcomputers, microcontrollers, digital signal processors, state machines, logic circuitries, and/or any devices that manipulate signals based on operational instructions. As one example, the controller 216 may include one or more hardware processors and/or logic circuits of any suitable type specifically programmed or configured to execute the algorithms and processes described herein such as for controlling one or more machining processes. In some cases, the controller may be configured to fetch and execute computer-readable control instructions 218, which may be stored in a computer-readable medium, and which may program the controller 216 to perform the functions described herein. Additionally, in other examples, the controller 216 may be eliminated or a different type of controller may be employed, as will be apparent to those of skill in the art having the benefit of the disclosure herein.

Figure 3:
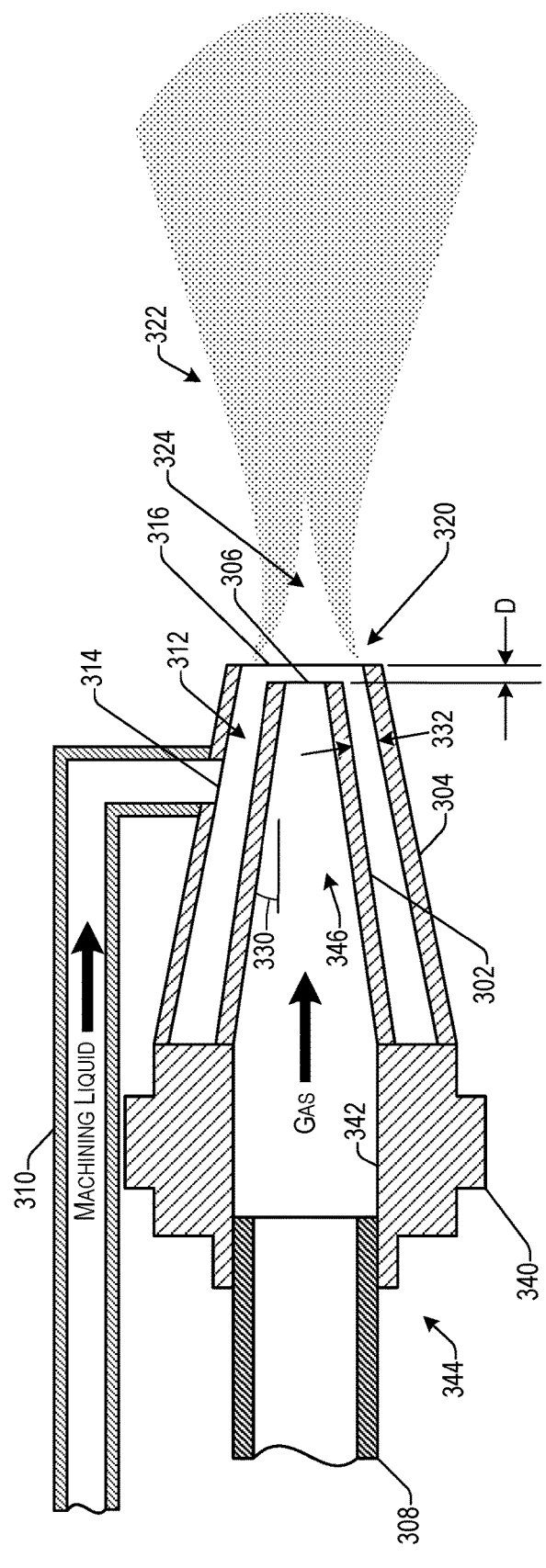
FIG. 3 illustrates an enlarged cross-sectional view of a nozzle assembly according to some implementations.

FIG. 3 illustrates an enlarged cross-sectional view of a nozzle assembly 122 according to some implementations. In the illustrated example, the nozzle assembly 122 includes a conical inner nozzle 302 and a conical annular outer nozzle 304. For example, the inner nozzle 302 may be a gas-delivery nozzle and the annular outer nozzle 304 may be a liquid delivery nozzle. For instance, the inner nozzle 302 may be conically tapered in shape toward an open end 306 so that the gas passing through the inner nozzle 302 expands upon exiting the open end 306. The gas may be delivered to the inner nozzle 302 under high pressure (e.g., 4 bars or greater) from the gas source(s) as discussed above with respect to FIGS. 1 and 2, such as through a gas line 308.

The machining liquid may be delivered to the outer nozzle through a liquid line 310. For example, the machining liquid may enter into an annular space 312 formed between the inner nozzle 302 and the outer nozzle 304 through an opening 314. The outer nozzle 304 is co-axially arranged with the inner nozzle 302 to create the annular space 312 around the inner nozzle 302. The machining liquid is delivered through the annular space 312 surrounding the inner nozzle 302. The edge of the open end 316 of the outer nozzle 304 may extend a distance D beyond the edge of the open end 306 of the inner nozzle 302. For instance, the distance D may be 0.1 to 1.5 mm in some examples, but the distance D may be dependent in part on the other dimensions of the nozzle assembly 122.

As illustrated at 320, the gas exiting the inner nozzle may shear the machining liquid exiting the annular space 312, generating droplets 322, while a portion of the gas remains as a conical core 324 that further entrains the droplets 322. After progression (e.g., within tens of millimeters distance), a fully developed mist spray of gas and liquid droplets mixture may be achieved. Further, rapid expansion of the gas exiting the nozzle cools the gas-liquid mixture to provide a cooling effect to the tool-workpiece interface. In addition, the spray coverage, due to expansion of the gas after exiting the nozzle exit, may also aid in breaking and flushing out chips and other particulates from the machining zone, which may improve plant maintenance and product quality, such as by reducing the likelihood of scratches being formed on the machined surface.

When impinging on the tool-workpiece interface, the sprayed gas-liquid mixture including the droplets may produce a dynamic fast moving thin fluid film. The thin fluid film may penetrate the tool-workpiece interface to provide cooling and lubrication during metalworking or other machining processes. In some cases, the machining liquid may flow into the annular space 312 by the help of gravity when the nozzle is oriented for machining. In some cases, as a non-limiting example, a taper angle 330 of the nozzles 302, 304 may be 4-10 degrees, an exit diameter at the open end 306 of the inner nozzle 302 may be 0.4-1 mm, and an annular gap 332 between the two nozzles may be 0.3-0.5 mm. For example, if the gap 332 is too small (e.g., less than 0.3 mm) the machining liquid might have difficulty flowing due to capillary action of the viscous fluid with the contact surfaces. On the other hand, if the gap 332 is too large, this may produce inconsistent and uneven flow of the machining liquid around the outer body surface of the inner nozzle. The outside of the outer nozzle 304 may also have a tapered shape so that long chips, if produced during machining, may not entangle or otherwise interfere with the nozzle assembly.

The inner nozzle 302 and the outer nozzle 304 are mounted to a nozzle body 340, which includes a hollow interior 342 having a first end 344 for receiving the gas line 308 and passing the gas to the inner nozzle 302, and a second end 346 terminating in the open end 306. The nozzle body 340 may be used for mounting and positioning the nozzles 302, 304 at a desired orientation with respect to the tool-workpiece interface.

Figure 4:
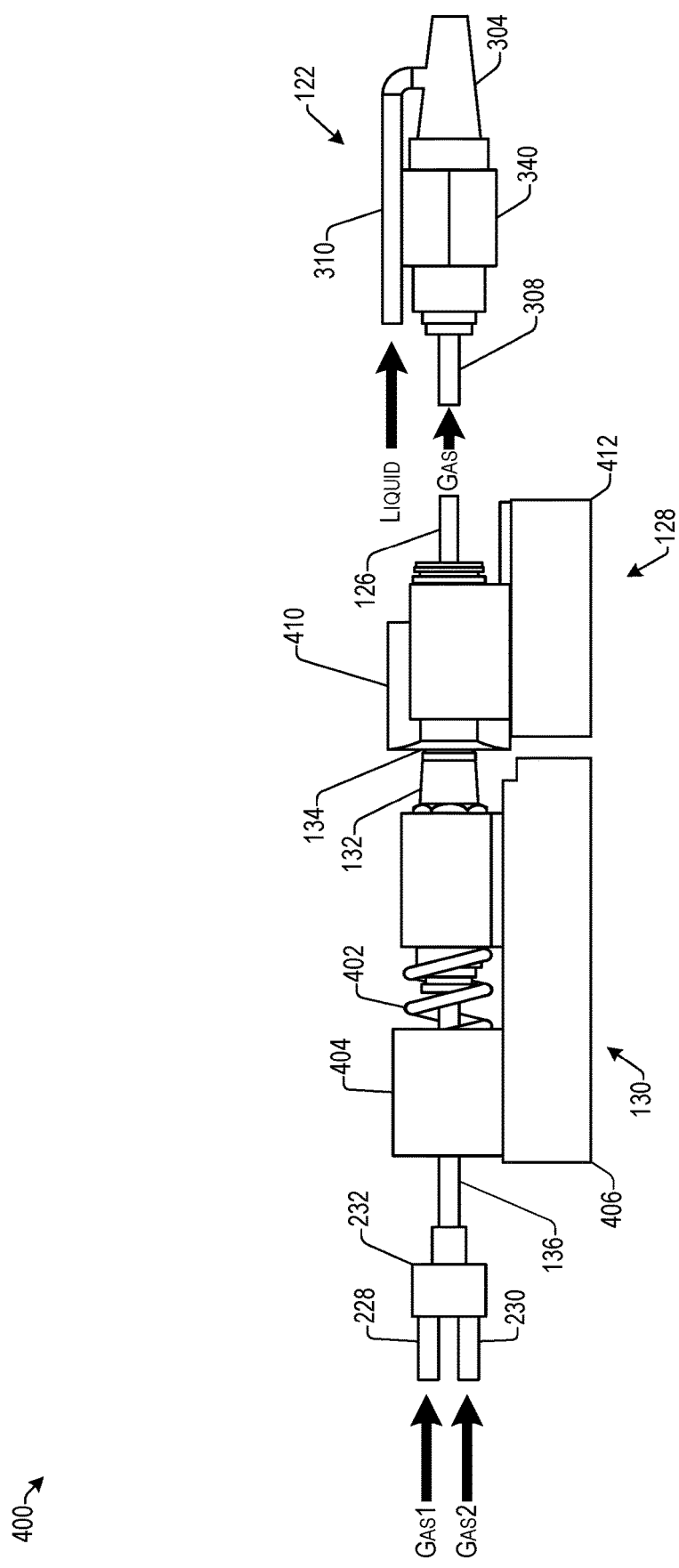
FIG. 4 illustrates a side view of components of a fluid delivery system according to some implementations.

FIG. 4 illustrates a side view of components of a fluid delivery system 400 according to some implementations. The fluid delivery system 400 may correspond to the fluid delivery systems of FIG. 1 and/or FIG. 2 in some examples. Thus, the system 400 includes the fluid-providing connector half 130, the fluid-receiving connector half 128, and the nozzle assembly 122. For instance, as discussed above, the Y junction 232 may receive gas through at least one of the gas line 228 or the gas line 230 and pass the gas through the fluid line 136 to the fluid-providing connector half 130. For instance, the connector half 130 with the connector nozzle 132 may be mounted on the static turret base (not shown in FIG. 4) and the connector half 128 with the detent 134 may be mounted on the rotatable turret (not shown in FIG. 4) or vice versa. Further, while gas is delivered through the connector halves 128, 130 in this example, in other examples, the machining liquid may be delivered through the connector halves 128, 130.

To deliver the gas to the nozzle assembly 122, the fluid-providing connector half 130 on the static turret base and the fluid-receiving connector half 128 on the turret are aligned (e.g., as discussed above with respect to FIG. 1) such that the connector nozzle 132 on the fluid-providing connector half 130 enters into the detent 134 on the fluid-receiving connector half 128 to couple a hollow bore (not shown in FIG. 4) formed through the connector nozzle 132 with a hollow bore (not shown in FIG. 4) leading from the detent 134 through the fluid-receiving connector half 128 and to the fluid line 126. For instance, the connector nozzle 132 may be pressed against the detent 134 by a spring 402 that is retained by a spring retainer 404 mounted on a base plate 406. The fluid line 136 may pass though the center of the spring 402 and may couple to the bore of the connector nozzle 132.

Further, the detent 134 may be formed in a female connector part 410 that is mounted on a base plate 412. As discussed additionally below, the female connector part 410 may include ramped surfaces for enabling the connector nozzle 132 to move in and out of the detent 134, such as in response to rotation of the turret or other relative movement between the fluid-providing connector half 130 and the fluid-receiving connector half 128.

The nozzle assembly 122 includes the outer nozzle 304, the liquid line 310, the nozzle body 340, and the gas line 308 that connects to the fluid line 126 for transferring gas to the inner nozzle of the nozzle assembly 122. Accordingly, in the illustrated example, the nozzle assembly 122 may receive pressurized gas through the fluid line 126 and the gas line 308, and may receive machining liquid through liquid line 310. The nozzle assembly 122 may be positioned to direct the liquid-gas mixture sprayed from the nozzle assembly 122 to a desired location, such as a tool-workpiece interface (not shown in FIG. 4). Further, in other examples, the fluid line 126 may be used instead to provide machining liquid to the liquid line 310.

Figure 5:
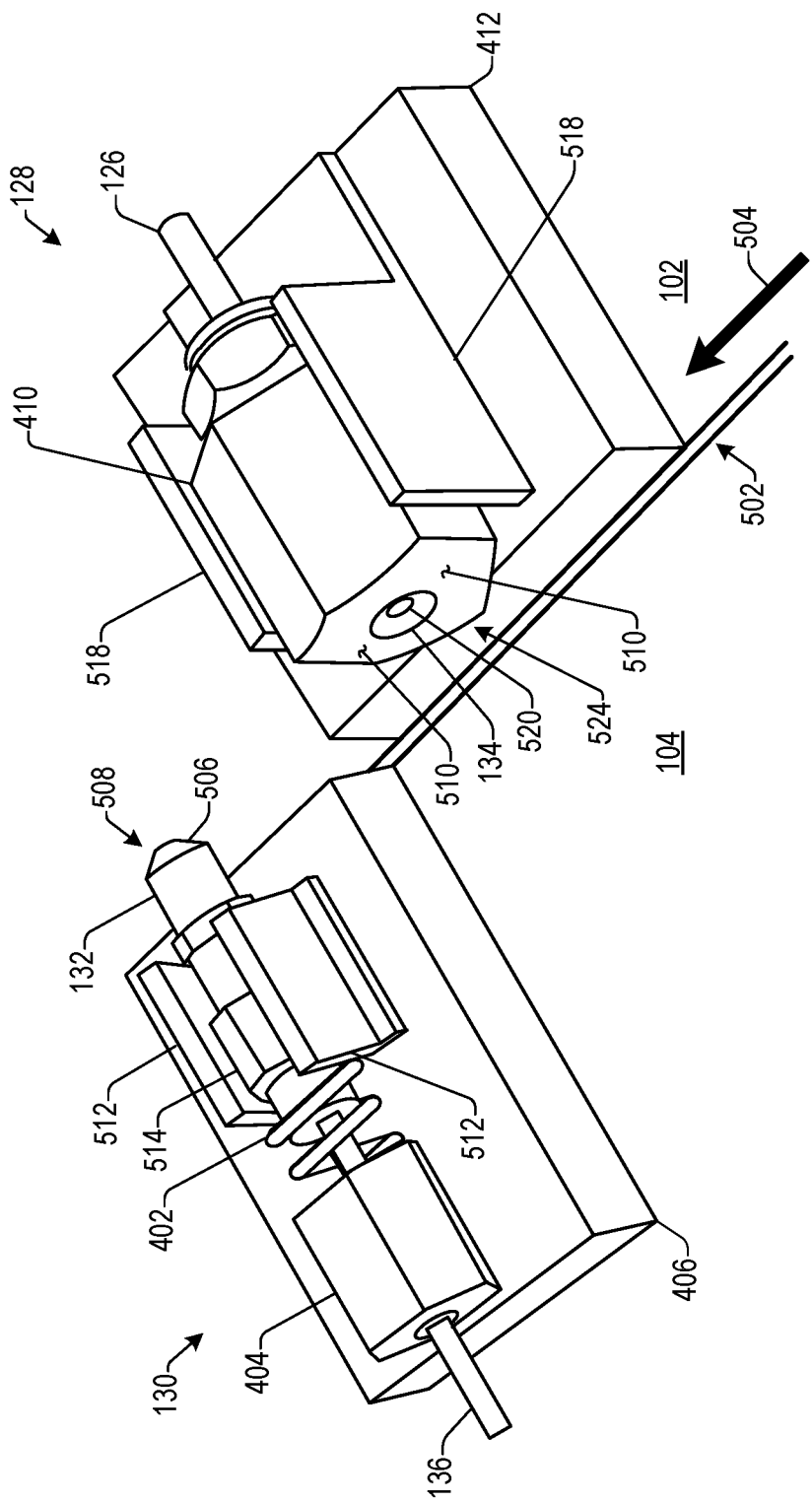
FIG. 5 illustrates perspective views of the fluid-providing connector half and the fluid-receiving connector half-according to some implementations.

FIG. 5 illustrates perspective views of the fluid-providing connector half 130 and the fluid-receiving connector half 128 according to some implementations. As mentioned above, the fluid-providing connector half 130 may be mounted on a surface of the turret base 104 and the fluid-receiving connector half 128 may be mounted on a surface of the turret 102. The turret 102 and turret base 104 are separated by a gap 502 that allows relative rotation between the turret 102 and the turret base 104 to enable the fluid-receiving connector half 128 to be aligned with the fluid-providing connector half 130, such as by movement of the turret 102 in the direction of arrow 504. As the fluid-receiving connector half 128 is aligned with the fluid-providing connector half 130, an inclined surface 506 on a distal end 508 of the connector nozzle 132 contacts a ramped surface 510 on the female connector part 410 to depress the connector nozzle 132 and the associated spring 402 for enabling the distal end 506 of the connector nozzle 132 to enter the detent 134. As discussed above with respect to FIG. 1, the turret 102 may be moved in either direction relative to the turret base 104. Accordingly, the turret 102 may be moved in the direction opposite to arrow 504 as well for engaging/disengaging the fluid-receiving connector half 128 with the fluid-providing connector half 130.

The fluid-providing connector half 130 includes a pair of side plates 512 that extend upward from the base plate 406. A nozzle support member 514 supports the connector nozzle 132 and is slideable back and forth between the side plates 512 in the direction of spring 402. The side plates 512 may further prevent the spring 402 from extending the connector nozzle 132 farther than a fully extended position as illustrated. The side plates 512 and the base plate 406 may be machined from a contiguous piece of material, such as metal, in some examples, while in other examples, the side plates 512 may be fastened to the base plate 406, such as by welding, mechanical fasteners, or the like. Thus, the side plates 512 have sufficient clearance between them to act as a guide for the nozzle support member 514 to enable freedom of motion of the nozzle support member 514 toward and away from the spring retainer 404. Furthermore, in some examples, the side plates 512 may be bent or sloped inward to prevent upward movement of the nozzle support member 514, such as upwards or out from between the side plates 512.

Further, the total distance of the distal end 508 from the nozzle support member 514 may be adjustable, such as by a threaded connection, or the like, for adjusting the position of the distal end 508 for contacting the ramped surface 510 on the female connector part 410. Accordingly, the connector nozzle 132 is depressible against the spring 402 when sufficient force is applied to the distal end 508, but the connector nozzle 132 does not extend beyond the fully extended position.

In addition, the fluid-receiving connector half 128 includes the female connector part 410 maintained within a pair of side plates 518 that extend upward from the base plate 412 and that provide lateral and longitudinal support to the female connector part 410 to maintain the female connector part 410 in a fixed position relative to the base plate 412. The side plates 518 and the base plate 412 may be machined from a contiguous piece of material, such as metal, in some examples, while in other examples, the side plates 518 may be fastened to the base plate 412, such as by welding, mechanical fasteners, or the like. The female connector part 410 may be fastened to the base 412 and/or the side plates 518, such as by mechanical fasteners, or any other suitable technique. As one example, the side plates 518 may be bent or sloped inward on to press tightly against the female connector part 410 with minimal clearance.

The female connector part 410 is held immobile relative to the base plate 412 by the side plates 518. The female connector part 410 includes a bore 520 generally centered in the detent 134. The bore 520 passes through the female connector part 410 and connects to the fluid line 126. Thus, when the distal end 508 of the connector nozzle 132 is aligned in the detent 134, a bore (not shown in FIG. 5) in the connector nozzle 132 aligns with the bore 520 in the female connector part 410 for enabling gas to pass from the connector nozzle 132 to the fluid line 126 and thence to the nozzle assembly (not shown in FIG. 5).

The nozzle support member 514 and connector nozzle 132 are free to move back and forth within the side plates 512 against the force generated by the spring 402. As discussed additionally below, when the distal end 508 of the connector nozzle 132 is positioned in the detent 134, the spring force may be sufficient to maintain a sealing contact between the connector nozzle 132 and the female connector part 410 so that an amount of gas pressure of the gas does not cause significant leakage at the connection. The spring constant of the spring 402 may be selected based in part on the pressure level of the gas being passed through the fluid line 136. As mentioned above, in some cases, multiple gases, such as air-carbon dioxide, or air-nitrogen can be mixed prior to arriving at the fluid-providing connector half 130 via the fluid line 136.

Further, while the fluid-providing connector half 130 is illustrated as being mounted on the static side, i.e., on the turret base 104, and the fluid-receiving connector half 128 is illustrated as being mounted on the turret 102 in this example, in other examples, the positions may be reversed, so that the connector half 128 may be mounted on the turret base 104 and the connector half 130 may be mounted on the turret 102. In such an arrangement, the connector half 130 receives the fluid and the connector half 128 provides the fluid, as the fluid flow still is from the turret base 104 to the turret 102 to provide fluid to the respective nozzle assemblies during machining operations. As discussed above with respect to FIG. 1, multiple tool stations may be provided on the turret 102. Thus, the number of movable connector halves 128 or 130 installed on the turret 102 may correspond to the number of tool stations on the turret 102 to enable gas or liquid to be supplied to respective individual nozzle assemblies associated with each tool station on the turret 102.

As discussed above with respect to FIG. 1, during multiple machining operations using multiple different tools, the turret 102 may be rotated to position a desired tool at a desired location. This means that the fluid-receiving connector half 128 on the turret 102 for the preceding operation moves out of alignment with the fluid-providing connector half 130, and a next fluid-receiving connector half moves into alignment with the fluid-providing connector half 130, such as due to movement of the turret 102 in the direction of arrow 504.

To enable the connector halves 128 and 130 to easily and automatically move in and out of alignment, a front surface 524 of the female connector part 410 includes a convex ramped surface 510 on either side of the detent 134. The ramped surface 510 contacts the distal end 508 of the connector nozzle 132 and depresses the spring 402 as the fluid-receiving connector half 128 and the fluid-providing connector half 130 are brought into alignment with each other. When aligned, the spring 402 forces the distal end 508 of the connector nozzle 132 into the detent 134 for forming a seal with the bore 520 in the detent 134. The force applied by the spring 402 (due to its spring constant) against the detent 134 minimizes any leakage of the high-pressure gas or other fluid supplied through the connector halves 128, 130. Accordingly, the spring must be selected to have a sufficiently high spring constant to minimize leakage at the junction of connector nozzle 132 and the detent 134. In some cases, a surface geometry of the distal end 508 of the connector nozzle 132 may be complimentary to a surface geometry of the detent 134, e.g., such as by having similar complimentary partial spherical surfaces, or the like, adjacent to the respective bores to ensure good coupling with minimum gaps or leakage.

Accordingly, the fluid coupling system including the fluid-receiving connector half 128 and the fluid-providing connector half 130 is able to disconnect and reconnect automatically as needed and without human intervention for delivering the fluids to different respective nozzle assemblies. As one example, a CNC program may be executed by a controller for performing various sequential machining operations while controlling delivery of machining fluid to the machining area. As mentioned above, in some examples, electromechanical systems such as programmable logical controllers (PLCs), programmable machine controllers (PMCs), or other programmable controllers may be used to control the fluid flow through the connector halves 128, 130. Alternatively, a mechanical system alone or a separate controller or CNC code(s) with the machine controller may be used to control fluid flow during machining and non-machining times. For instance, a shutoff valve (not shown in FIG. 5) may be associated with the fluid line 136 and may be operable for starting or stopping the flow of fluid through the connector halves 128, 130. As one example, the shutoff valve may automatically engage to prevent fluid flow when the connector nozzle 132 is not engaged with the detent 134 on one of the connector halves 128.

Figure 6A:
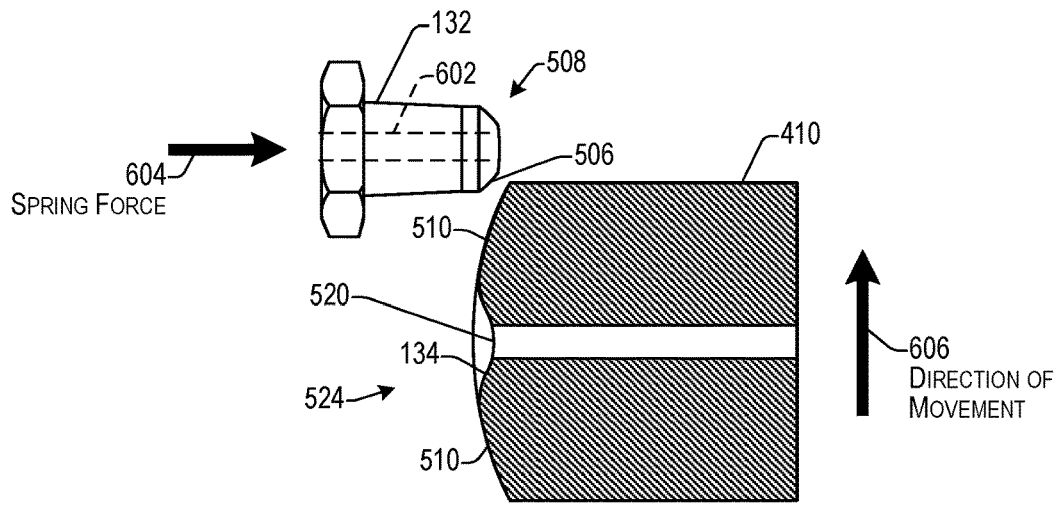
FIGS. 6A-6C illustrate an example of engagement/disengagement of the connector nozzle with the detent according to some implementations.
Figure 6B:
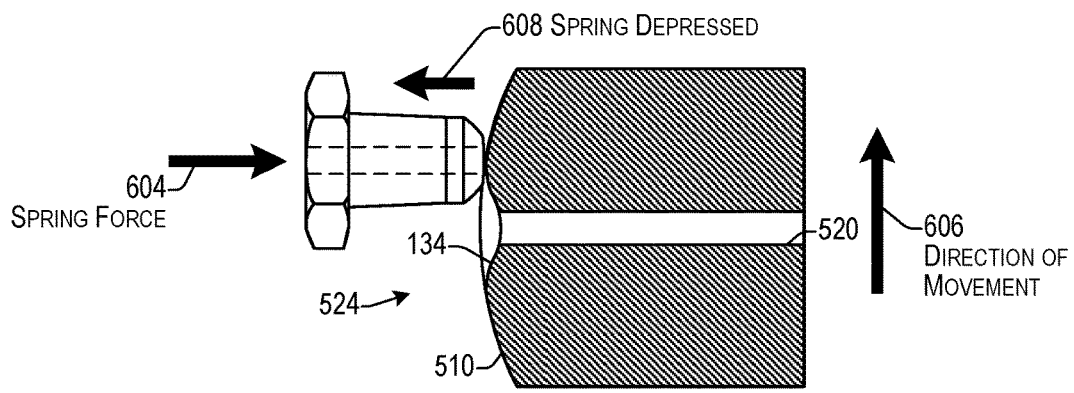
Figure 6C:
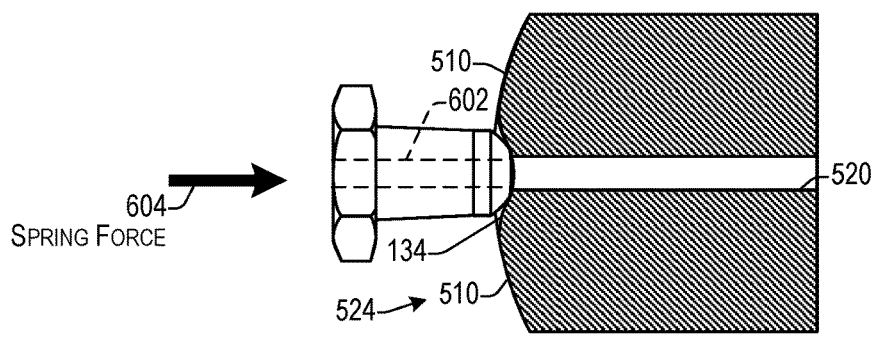

FIGS. 6A-6C illustrate an example of engagement/disengagement of the connector nozzle 132 with the detent 134 according to some implementations. In FIG. 6A, the female connector part 410 is illustrated in cross section showing the bore 520 passing through the female connector part 410. Further, a bore 602 is shown in hidden lines passing through the connector nozzle 132 and spring force is applied to the connector nozzle 132 in the direction shown by arrow 604, i.e., toward the female connector part 410. In this example, suppose that the fluid-receiving connector half is mounted on a moving part and is being moved in a direction of movement as indicated by arrow 606 for aligning the bore 520 with the bore 602.

As illustrated in FIG. 6B, as the inclined surface 506 on the distal end 508 of the connector nozzle 132 contacts the convex ramped surface 510 on the front face 524 of the female connector part 410, ramped surface 510 pushes the connector nozzle 132 against the spring force in a direction of arrow 608 so that the spring is depressed. As one example, the distance moved by the connector nozzle 132 against the spring force 604 due to contacting the ramped surface 510 may be 2-5 mm or the like, depending at least partially on other dimensions of the connector halves and the amount of spring force desired to be applied to connector nozzle 132 when positioned in the detent 134.

As illustrated in FIG. 6C, as the connector nozzle 132 reaches alignment with the detent 134, the spring force 604 forces the distal end 508 of the connector nozzle 132 into the detent 134 to align the bore 602 in the connector nozzle 132 with the bore 520 in the female connector part 410. Thus, a connection is formed establishing fluid communication between the bore 520 and the bore 602 for passing gas through the connection as discussed above. The spring continues to apply the spring force 604 while the connector nozzle 132 is positioned in the detent 134 to form a seal between the bore 602 and the bore 520.

If the female connector part 410 were to continue moving in the direction of arrow 606, the inclined surface 506 enables the connector nozzle 132 to ride up the other side of the detent 134 and back down the other ramped surface 510 to disengage from the female connector part 410. As an example, the inclined surface 506 may be at an angle between 30 and 60 degrees with respect to the direction of movement. Similarly, a surface of the detent 134 may be at an angle between 30 and 60 degrees with respect to the direction of movement to enable smooth engagement and disengagement between the detent 134 and the distal end 508 of the connector nozzle 132. As will be apparent, the connector nozzle 132 may also be disengaged from the detent 134 by movement of the female connector part 410 in a direction opposite to arrow 606. Furthermore, in other examples, the connector nozzle 132 may move relative to the female connector part 410 in addition to, or as an alternative to, the movement of the female connector part 410.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A machining apparatus comprising:
    a fixed member adjacent to a moveable member, wherein the moveable member is movable relative to the fixed member;
    a plurality of tools mounted on the moveable member, wherein movement of the moveable member positions a selected tool of the plurality of tools for use in performing an operation;
    a first connector half disposed on the fixed member and for connecting to a respective second connector half of a plurality of second connector halves disposed on the moveable member, wherein the respective second connector half is associated with the selected tool of the plurality of tools, wherein the movement of the moveable member to position the selected tool for use in performing the operation moves the respective second connector half associated with the selected tool into connection with the first connector half; and
    a respective nozzle assembly associated with the selected tool, the respective nozzle assembly receiving a plurality of fluids including receiving gas through a gas line and a machining liquid through a liquid line, wherein a first fluid of the plurality of fluids is received by the respective nozzle assembly through the connection between the first connector half and the respective second connector half, the respective nozzle assembly including an inner nozzle and an annular outer nozzle, wherein the machining liquid is provided to an annular space between the inner nozzle and the annular outer nozzle, and the gas passes through the inner nozzle to generate a mixture of the gas and the machining liquid to direct toward a tool-workpiece interface.

2. The machining apparatus as recited in claim 1, the respective nozzle assembly further comprising:
    the inner nozzle including a first end to connect to a gas source, the inner nozzle including an open end for gas from the gas source to exit toward the tool-workpiece interface; and the annular space including an annular opening around the open end of the inner nozzle, wherein the gas exiting the open end impinges on the machining liquid to generate a spray including a mixture of the gas and the machining liquid to direct toward the tool-workpiece interface.

3. The machining apparatus as recited in claim 2, wherein the respective nozzle assembly is configured so that the gas exiting the open end of the inner nozzle causes a shearing of the machining liquid exiting the annular opening to produce liquid droplets mixed with the gas.

4. The machining apparatus as recited in claim 2, wherein an edge of the annular opening extends beyond an edge of the open end of the inner nozzle in a direction of travel of the gas.

5. The machining apparatus as recited in claim 1, wherein further movement of the moveable member causes the respective second connector half to automatically disengage from the first connector half and an other second connector half of the plurality of second connector halves to automatically engage with the first connector half to enable fluid communication between the first connector half and the other second connector half to provide the first fluid to an other nozzle assembly associated with an other tool of the plurality of tools.

6. The machining apparatus as recited in claim 1, wherein the first connector half includes a connector nozzle having a first bore with a first bore opening on an end of the connector nozzle, the connector nozzle being biased by a spring force in a direction toward the movable member; and respective second connector half including a detent having a second bore, wherein the second bore is placed into fluid communication with the first bore opening of the connector nozzle when the end of the connector nozzle is biased into the detent by the spring force to enable fluid communication between the first connector half and the respective second connector half when the respective second connector half is aligned with the first connector half.

7. The machining apparatus as recited in claim 6, further comprising a ramped surface disposed adjacent to the detent, wherein during the movement of the movable member, the end of the connector nozzle moves along the ramped surface against the spring force prior to the end of the connector nozzle entering the detent.

8. The machining apparatus as recited in claim 6, wherein the end of the connector nozzle includes a chamfered surface that enables the end of the connector nozzle to exit the detent by movement of the detent relative to the end of the connector nozzle in a direction of movement of the movable member during further movement of the movable member.

9. The machining apparatus as recited in claim 6, wherein the spring force forms at least a partial seal between the first bore opening and the second bore when the end of the connector nozzle is positioned in the detent.

10. An apparatus comprising:
a nozzle assembly associated with a selected tool of a plurality of tools, the nozzle assembly including an inner nozzle and an annular outer nozzle, the annular outer nozzle forming an annular space between the inner nozzle and the annular outer nozzle;
the inner nozzle including a first end to connect to a gas source, the inner nozzle including an open end for gas from the gas source to exit toward a target; and
a liquid line connecting the annular space to a liquid source to provide a machining liquid to the annular space, the annular space including an annular opening around the open end of the inner nozzle, wherein the gas exiting the open end impinges on machining liquid exiting the annular opening to generate a spray including a mixture of the gas and the machining liquid to direct toward the target, wherein:
the plurality of tools are mounted on a moveable member that is movable relative to a fixed member, wherein movement of the moveable member positions the selected tool for use in performing an operation;
a first connector half is located on the fixed member and for connecting to a respective second connector half of a plurality of second connector halves mounted on the moveable member,
the respective second connector half is associated with the selected tool of the plurality of tools, wherein the movement of the moveable member to position the selected tool for use in performing the operation moves the respective second connector half associated with the selected tool into connection with the first connector half; and
the nozzle assembly associated with the selected tool receives one of the gas or the machining liquid through the connection between the first connector half and the respective second connector half.

11. The apparatus as recited in claim 10, wherein the nozzle assembly is configured so that the gas exiting the open end of the inner nozzle causes a shearing of the machining liquid exiting the annular opening to produce liquid droplets mixed with the gas.

12. The apparatus as recited in claim 10, wherein an edge of the annular opening extends beyond an edge of the open end of the inner nozzle in a direction of travel of the gas.

13. The apparatus as recited in claim 10, wherein the inner nozzle and the annular outer nozzle are conical in shape.

14. The apparatus as recited in claim 10, wherein the first connector half includes a connector nozzle having a first bore, the first bore including a first bore opening on an end of the connector nozzle,
the connector nozzle is biased by a spring force in a direction toward the movable member; and
the respective second connector half includes a detent having a second bore, wherein the second bore is placed into fluid communication with the first bore opening of the connector nozzle based on the spring force biasing the end of the connector nozzle into the detent during the movement of the movable member.

15. The apparatus as recited in claim 14, further comprising a ramped surface disposed adjacent to the detent, wherein during the movement of the movable member, the end of the connector nozzle moves along the ramped surface against the spring force prior to the end of the connector nozzle entering the detent.

16. The apparatus as recited in claim 14, wherein the end of the connector nozzle includes a chamfered surface that enables the end of the connector nozzle to exit the detent by movement of the detent relative to the end of the connector nozzle in a direction of movement of the movable member during further movement of the movable member.

17. An apparatus comprising:
a first connector half located on a first member and positioned for connecting to a respective second connector half of a plurality of second connector halves located on a second member, wherein the first member is a fixed member and the second member is a moveable member that is movable relative to the first member such that individual ones of the plurality of second connector halves are positionable to connect with the first connector half;

the first connector half including a connector nozzle having a first bore with a first bore opening on an end of the connector nozzle, the connector nozzle being biased by a spring force in a direction toward the movable member;

the respective second connector half including a detent having a second bore, the detent facing in a direction toward the fixed member;

the respective second connector half including a ramped surface disposed adjacent to the detent; and a plurality of tools mounted on the moveable member, wherein:

movement of the moveable member positions a selected tool of the plurality of tools for use in performing an operation, the respective second connector half is associated with a the selected tool of the plurality of tools, the movement of the moveable member to position the selected tool for use in performing the operation automatically moves the respective second connector half associated with the selected tool into connection with the first connector half, during the movement of the movable member to position the selected tool for use in performing the operation, the end of the connector nozzle moves along the ramped surface against the spring force prior to the end of the connector nozzle entering the detent, and during the movement of the movable member, the second bore is placed into fluid communication with the first bore opening of the connector nozzle based on the spring force biasing the end of the connector nozzle into the detent.

18. The apparatus as recited in claim 17, further comprising:

a respective nozzle assembly associated with the selected tool, the respective nozzle assembly configured for receiving a plurality of fluids including receiving gas through a gas line and a machining liquid through a liquid line, wherein a first fluid of the plurality of fluids is received by the respective nozzle assembly through the connection between the first connector half and the respective second connector half; and the respective nozzle assembly including an inner nozzle and an annular outer nozzle, wherein the respective nozzle assembly is configured to receive the machining liquid in an annular space between the inner nozzle and the annular outer nozzle, and further configured for the gas to pass through the inner nozzle to generate a mixture of the gas and the machining liquid to direct toward a tool-workpiece interface.

19. The apparatus as recited in claim 17, wherein the end of the connector nozzle includes a chamfered surface that enables the end of the connector nozzle to exit the detent by movement of the detent relative to the end of the connector nozzle in a direction of movement of the movable member during further movement of the movable member.

20. The apparatus as recited in claim 17, wherein the spring force forms at least a partial seal between the first bore opening and the second bore when the end of the connector nozzle is positioned in the detent.

* * * * *